Figures 10, 11:
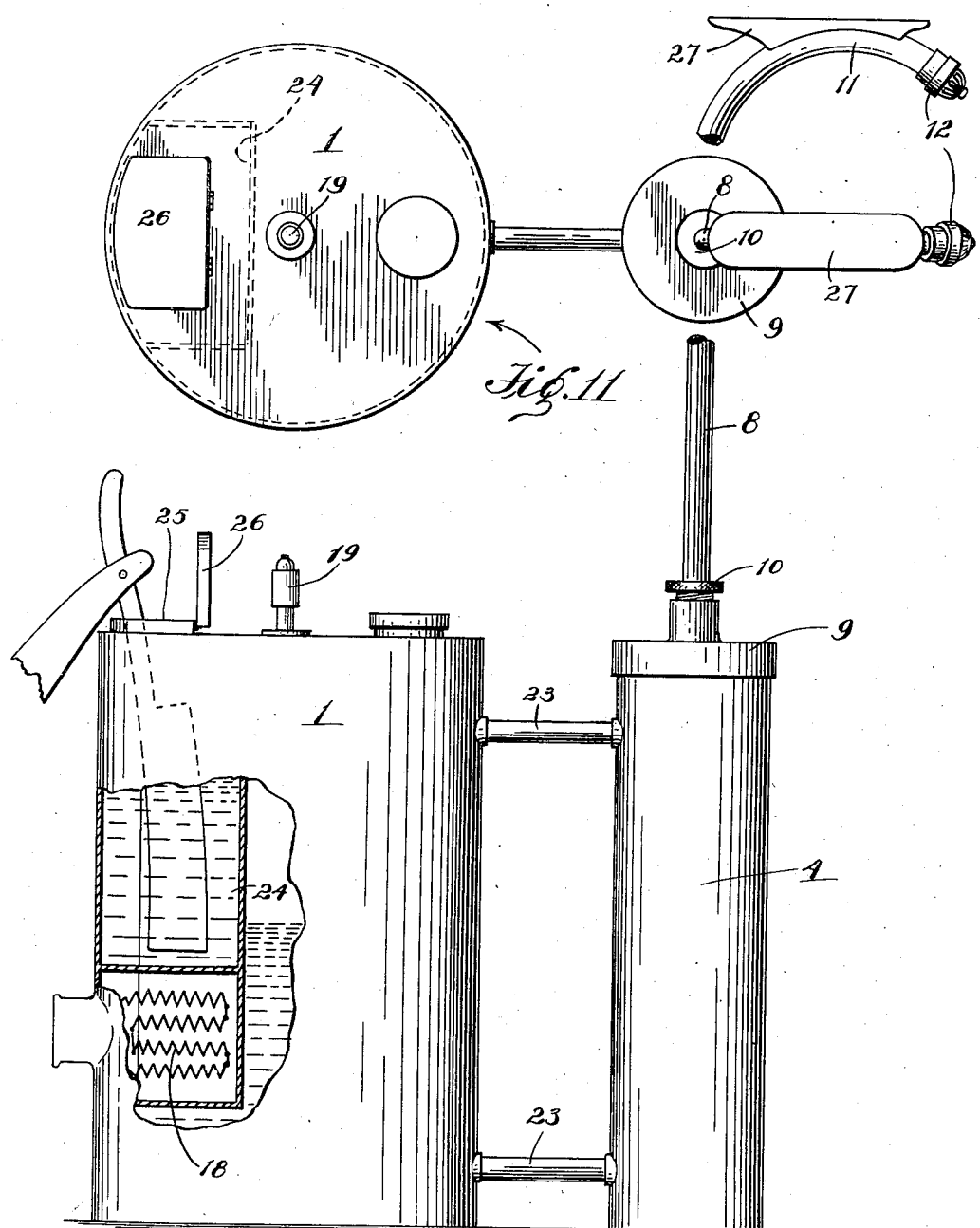

May 12, 1925. 1,537,552
M. ROTUNNO
LATHER MAKING DEVICE
Filed Feb. 7, 1923 2 Sheets-Sheet 1
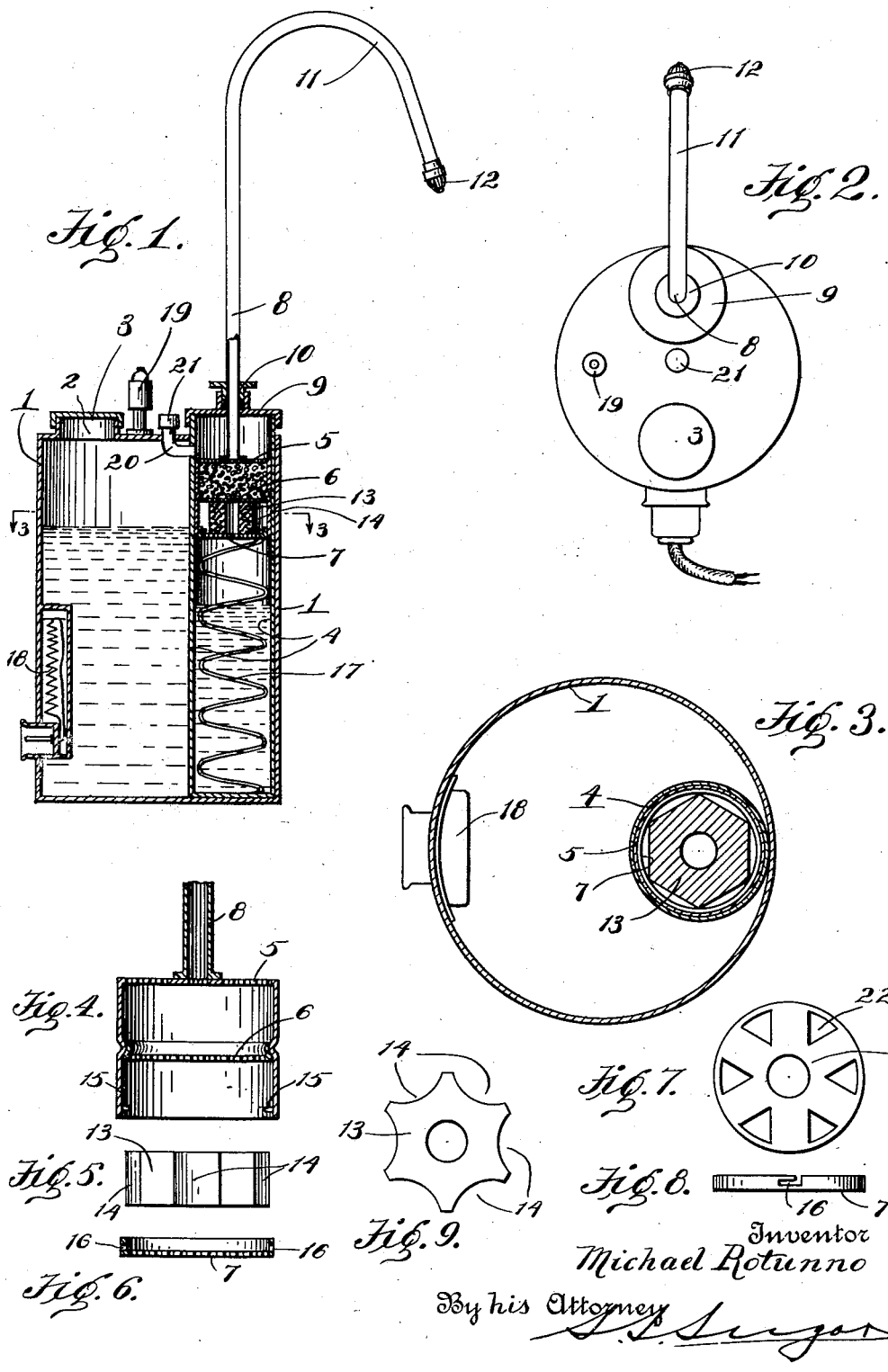

May 12, 1925.

M. ROTUNNO

LATHER MAKING DEVICE

Filed Feb. 7, 1923

1,537,552

2 Sheets-Sheet 2

Inventor
Michael Rotunno
By his Attorney

Patented May 12, 1925.

1,537,552

UNITED STATES PATENT OFFICE.

MICHAEL ROTUNNO, OF NEW YORK, N. Y.

LATHER-MAKING DEVICE.

Application filed February 7, 1923. Serial No. 617,488.

*To all whom it may concern:*

Be it known that I, MICHAEL ROTUNNO, citizen of the United States, and resident of New York, in the county of Bronx and State of New York, have invented certain new and useful Improvements in Lather-Making Devices, of which the following is a specification.

This invention relates to improvements in lather making devices for use in barber shops and the like.

The objects of this invention are first, to provide a device, of the character described, wherein a soap holding compartment is adapted to reciprocal movement within a liquid container to agitate the liquid contained therein and thus create a foam or lather which is conveniently ejected from a spout; second, to provide such a device, wherein means are employed to heat the liquid so that warm lather may be created and ejected; third, to provide a device as mentioned, wherein a sterilizing compartment is employed in combination therewith, for the purpose of sterilizing razors and other implements required to be treated for sterilization, and fourth, to provide an apparatus which will accomplish the objects hereinbefore set forth, and be of simple construction and economical in cost of manufacture.

These objects are attained by the device illustrated in the accompanying drawings, in which:

Figure 1. Is a sectional elevation of the lather making device.

Figure 2. Is a top view of same.

Figure 3. Is an enlarged sectional plan view taken along the line 3—3 of Figure 1.

Figure 4. Is an enlarged sectional view of the plunger forming a part of the apparatus.

Figure 5. Represents a cake of soap which is adapted to fit within a recess formed upon the plunger of a particular formation as will be hereinafter described.

Figure 6. Is a cap or closing member which fits upon the plunger over the soap.

Figure 7. Is a bottom view of the cap shown in Figure 6.

Figure 8. Is a side view, of said cap.

Figure 9. Is a plan view of the cake of soap.

Figure 10. Is an elevation, partly in section, of a modified form of this apparatus and is shown approximately full size, and Figure 11. Is a plan view of same.

Referring in detail to the parts, 1, designates a container adapted to hold water or other suitable liquid and formed with a filling opening 2, and cap 3, therefor.

A tubular section 4, extends through the container 1, and is adapted to house a plunger consisting of a casing 5, dividing partition 6, and cap member 7, all of which are perforated as shown. The casing 5, is provided with and connected to a tubular member 8, which passes through the cap 9, and is made watertight by means of the packing 10. The said tube 8, terminates in a gooseneck formation 11, is provided with a suitable closing member 12, and provides a means by which the plunger may be moved within its compartment.

The casing 5, is intended to contain and hold therein small gravel, pebbles or beads, while a cake of soap 13, having grooved formations 14, is adapted to be held within the lower portion of said casing 5, by means of the cap 7. The said cap is suitably held and locked in position, by means of pins 15, which are adapted to engage the L-shaped groove 16, in the cap.

The entire plunger and its connected tube 8, is adapted to reciprocal movement within the tube 4, by means of the said tube 8 and spring 17, and is held in its uppermost position by the action of said spring.

A heating element 18, suitably housed, may be provided and by means of suitable plug attachment may be electrically energized to heat water or liquid within the container 1. The safety or blow-off valve 19, is provided as a guard against explosion from undue heating pressure and a filling tube 20, having a suitable cap 21, is also provided for the purpose of pouring liquid into the tube compartment.

In the operation of the device to create a lather, the plunger is repeatedly pressed down against the action of the spring causing an agitation of the water within the tube. The repeated reciprocal movement of the plunger forces the liquid back and forth through the soap grooves and pebbles or beads within the casing 5, thus quickly creating a foam or lather which, by the continued action of the plunger, is forced through the tube 8, and out at its end where it is available for use, when the cap is removed.

As heretofore mentioned, the casing 5, partition 6, and cap 7, are perforated but it is obvious that these perforations may be a multiplicity of small apertures, of a sieve like formation, or they may be formed by cut-out portions of any shape whatever as shown at 22, in Figure 7. Further, the soap, instead of having the grooved formations 14, shown in Figures 5 and 9, may be formed as shown in Figure 3, or in any other desirable way.

As shown in Figures 10 and 11, the tubular container may be attached outside of the liquid container 1 and connected thereto by means of tubes 23; the liquid being provided through the tubes 23, from the container 1. In combination with this form, a sterilizing compartment 24, is provided and this compartment is formed within the container 1, as a part of the apparatus. The said sterilizing compartment is provided with an opening 25, and closing member 26 and for use is partially filled with any suitable sterilizing liquid which may be heated by means of the heating element 18. The compartment 24, provides a means, in connection with the lather-making machine, wherein a common heating element is employed, for sterilizing razors, brushes and other implements commonly used by barbers in their shops. In the modified form shown in Figures 10 and 11, a pushing element 27, may be provided against which the palm or side of the hand of the user may make contact to facilitate operating the plunger.

While an electrical means for heating the liquid and lather is shown as the preferred embodiment, it is obvious that the device may be placed over any suitable gas burner or other heating means in order to heat the liquid to produce a warm lather.

Various other modifications may be employed in this invention without departing from the spirit of same and it is therefore not intended to limit this invention to the particular embodiments shown.

What is claimed:—

1. In a lather-making device, a liquid containing member, a soap containing, perforated plunger, operable within same, an ejector tube and plunger operating means attached to said plunger and connecting with the interior thereof, and spring operating means for normally maintaining the said plunger in its uppermost position.

2. The device of claim 1, wherein means are provided for heating the liquid within the device.

3. In a lather-making device, a liquid containing member, a soap containing, perforated plunger within same, an ejector tube and plunger operating means attached to said plunger and connecting with the interior thereof, spring actuating means within the plunger chamber to normally maintain the plunger in its uppermost position, an outer liquid containing member arranged around the aforesaid liquid containing member and means for heating the liquid within the said outer chamber.

4. The device of claim 3, wherein the heating means is an electrically energized element, suitably arranged within the outer container.

MICHAEL ROTUNNO.

Witnesses:
HARRY H. HORWITZ,
PAUL ZWEIGBAUM.